July 29, 1941.    W. F. NORDMEYER    2,250,810
CARRIER ASSORTING AND TRANSFER DEVICE
Filed July 22, 1937
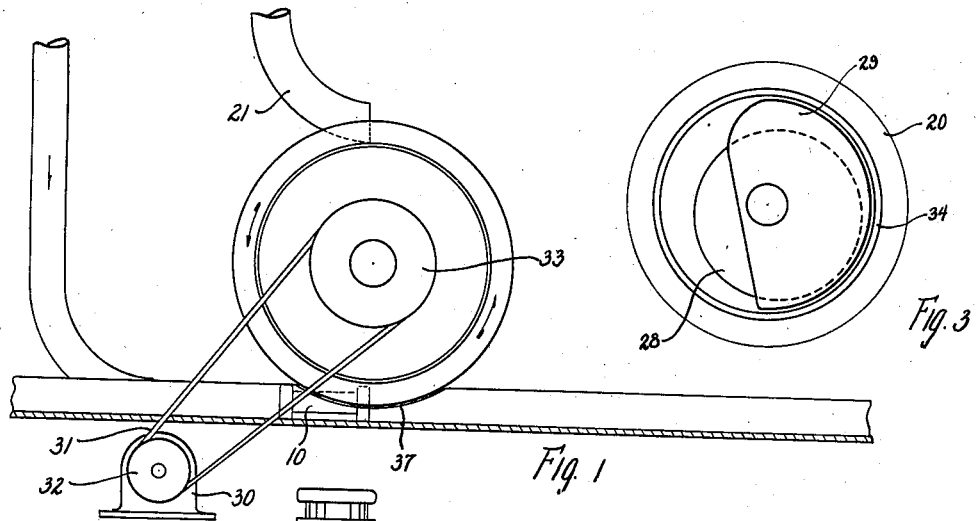
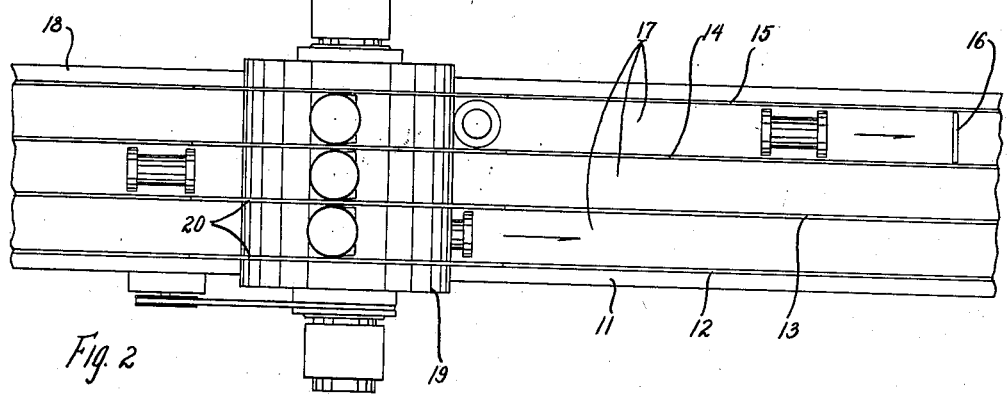
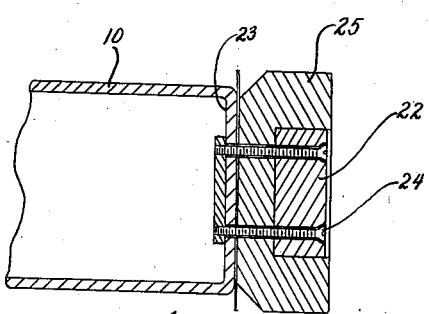
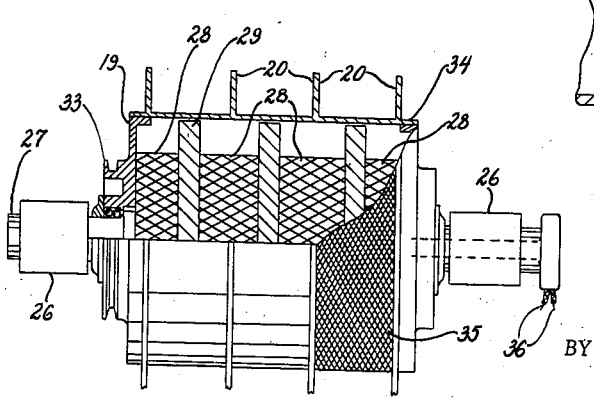
INVENTOR.
William F. Nordmeyer
BY Frank Zugelter
ATTORNEY.

Patented July 29, 1941

2,250,810

UNITED STATES PATENT OFFICE 2,250,810

CARRIER ASSORTING AND TRANSFER DEVICE

William F. Nordmeyer, Lockland, Ohio

Application July 22, 1937, Serial No. 155,092

4 Claims. (Cl. 243—16)

An object of this invention is to provide a simple, inexpensive and effective apparatus especially adapted to department stores and the like for conveying to selected stations, various coin carrying devices and the like, determined by the contents of the carriers.

In, for example, department stores, it is common to use pneumatic conveyor or carrier systems comprising tubes through which various cartridge-like carriers are moved between sales persons located at various stations throughout the department store and money changers or cashiers generally assembled in some remote portion of the institution. In the ordinary transaction of business in such establishments, the various customers comprise persons who pay cash for their purchases and some who have their purchases charged against accounts. By reasons of this fact, it is necessary, at the cashier's desk at which the records of charge accounts are kept and at which change is likewise made in connection with the cash transactions, that each of the individual transactions be handled properly and in a minimum period of time, because the customer ordinarily is obliged to wait at the counter at which the purchase was made, until the carrier or cartridge is returned to the sales person. It is obvious, from what has been related, that during rush periods, particularly during periods when sales are conducted, that there may be a very great movement of cash carriers or cartridges between the various sales counters and the cashier's department at which the change and charges are handled. Consequently, in the absence of any accommodations for handling such conditions to best advantage, confusion and delay may be expected by reason of conditions in the cashier's office or department.

This would naturally follow if it should develop that a certain clerk, assigned to handle cash transactions, should receive charge transactions which would necessitate leaving the station at which such person ordinarily works and then consult the records to determine whether any charge was properly accepted. In order to meet this situation, it has been common practice to have the various carriers or cartridges discharged at one desk or table and at which desk or table various clerks handling cash transactions are stationed. In some instances a so called cross over penumatic system is employed so that when any clerk at the cash transaction desk opens a cash carrier or cartridge and finds that a charge transaction is involved, the cartridge may be closed and passed through the cross over pneumatic system to the credit department where another clerk approves the charge account. After the person at the credit desk has approved the transaction, the cartridge or carrier is returned by way of the cash desk so that at the cash desk, the clerks can return the carrier to the sales desk or station at which the transaction originated. This necessarily is done because in most installations there is but one inlet to the return tube to a given sales station, and in order to expedite handling of transactions, such return inlet ports to the return tubes are disposed adjacent the stations at which the clerks handling cash transactions are positioned. From the foregoing explanation, it is obvious that considerable manual manipulation is required at the cash transaction desk.

An object of the invention is to provide means and apparatus whereby cartridges or carriers containing cash and charge transactions may be automatically separated and automatically delivered to the proper stations, viz., to the cash transaction desk and to the credit station or desk.

Another object of the invention is to provide apparatus for obtaining the indicated objectives and which will permit the attainment of the added advantage of facilitating the breaking up of the pneumatic carrier tube system, particularly the return tubes of such a system into separate sets or series. By so doing, it is possible to simplify installations of the character under consideration to conserve space incident to such installations and to substantially increase the efficiency with which transactions of the character under consideration may be handled.

These and other objects are attained by the means described herein and disclosed in the accompanying drawing, in which:

Fig. 1 is a view in elevation showing diagrammatically, parts being shown in section, apparatus embodying the invention.

Fig. 2 is a plan view of parts shown in Fig. 1.

Fig. 3 is a transverse sectional view of a transfer drum, forming a detail of the invention.

Fig. 4 is a plan view partly in section, of the apparatus shown in Fig. 3.

Fig. 5 is an enlarged sectional view of a carrier or cartridge forming a detail of the invention.

In connection with the disclosure about to be explained, it must be understood that in a given establishment, for example, in a department store, there have been installed, the customary pneumatic tubes for conveying carriers or cartridges 10 back and forth between various sales stations and a station which, for the purpose of this description, will be referred to as the cashier's station or department. Various tubes are adapted, by means well known in the art, to collect the various carriers in the cashier's station. Ordinarily, the various cartridges 10 are identified by a number or other symbol to indicate the station from which they are sent to the cashier's department. A pair of tubes is provided for each carrier symbol, one of such tubes constituting the course or passage through which the carrier moves from a given sales station to the cashier's department and the other of such pair of tubes constituting the return tube from the cashier's position to the identical sales station. The inlet ports of the return tubes are marked to identify or associate same with the various cartridges so that the various cashiers and assistants can readily return a given carrier to its original station. Ordinarily, the carriers from a given group of sales stations are adapted to discharge at a common place upon a carrier belt or conveyor 11. Ordinarily, a number of longitudinal partitions 12, 13, 14 and 15 are used to provide a plurality of channels between them, and above the conveyor belt, and through which the cartridges are carried to the various stations of the cashier's clerks. Ordinarily, an adjustable stop such as 16 may be attached to the partitions so as to limit the extent to which the carriers may be carried along any of the various channels such as 17 formed between the partitions. Heretofore, due to various limitations met in meeting the practical problems in this art, equipment of the character under consideration has been limited to two channels such as 17. Without going into detail as to such limitations, it is sufficient to state that by reason of the instant invention, the number of channels such as 17 may be substantially increased, though preferably and practically three channels such as 17 will ordinarily be sufficient.

At various places, at or adjacent the stop 16, there may be positioned intake or inlet ports of the return tubes, not shown. At a suitable distance beyond such assembly of inlet ports, another group of inlet ports to return tubes may be positioned, and so on, depending upon the number of such banks of return tubes that may be provided longitudinally of the conveyor 11. It is to be understood that the tubes leading from given stations will be assembled in the proper channel 17 at the receiving end 18 of the conveyor 11.

Intermediate the receiving end 18 of the conveyor 11 and the first stop such as 16 in any of the channels 17, there is provided a means for selectively picking up cartridges 10 from the channels 17 and conveying such cartridges to a suitable pneumatic tube provided for carrying such selected cartridges to the charge desk of the cashier's department. This pick up of cartridges from the channel 17 may be accomplished in various ways. As disclosed herein, the pick up apparatus comprises a hollow revolving drum 19 having formed thereon a plurality of ribs 20 each of which registers with a partition such as 12, 13, 14, and 15, thus substantially providing continuations of the individual channels 17 and serving to prevent the carriers picked up from the various channels 17, from being co-mingled. The carriers or cartridges are adapted to be picked up by means of magnetic attraction. This may be accomplished in various ways. As shown herein, various of the cartridges such as 10 and which are intended for use in association with cash transactions, would be made wholly of material nonresponsive to magnetic attraction. Ordinarily, such cartridges are made of brass, and are tubular, having a central shutter or door controlling access to the interior thereof. At the ends of the cartridge it is customary to provide a suitable felt or similar washer which is instrumental in effecting proper movement of the carriers or cartridges through the tubes and all of which is common practice in the art. In instances where a sale has been effected in connection with a charge or credit transaction, the sales person would select a cartridge that was specially arranged or constructed to be responsive to magnetic attraction so that when such cartridge passes beneath the drum, the cartridge is lifted and is elevated or carried to a position such that the cartridge is or may be received in a cross over tube, such as is indicated generally at 21 of Fig. 1. In order that certain of the cartridges 10 may be responsive to magnetic attraction, suitable iron or similar washers or end caps 22 are provided at both ends of the tubular bodies 23 of the cartridges or carriers 10. The washers 22 may be attached in any suitable manner, for example, by means of rivets 24. The felt or plush, previously referred to as being disposed at the ends of the carriers, is shown at 25.

Ordinarily, different colored felts or plush members are used upon the various carriers to distinguish the carriers that are to be used for cash transactions from the carriers that are to be used for credit or charge transactions. Thus, the sales person, when preparing to transmit the proceeds of a given transaction, or the charge slip thereof to the cashier's office, would select a proper carrier in view of the nature of the transaction, and after enclosing the material within the carrier, would insert the carrier in the pneumatic tube for conveying the carrier to the cashier's department. The carrier would be discharged into its proper channel 17 and would pass under the drum 19 on its way to its proper station and at which the cashier's clerk would be waiting to make change and then return the cartridge to the sending station. In those instances where the sales person had selected a cartridge intending to convey the contents thereof to a cashier's assistant located at a charge or credit desk, the magnetic attraction of the drum 19 would serve to withdraw the particular cartridge or carrier and divert or transfer it to the proper charge clerk. After the charge clerk had completed her end of the transaction, the carrier would be returned, by one of the referred to cross over conveyors, to the proper station in association with the conveyor 11 at which the inlet port to return tube for that particular carrier, is disposed. The cash clerk would therefore receive the carrier from the charge clerk and would dispatch the same to its original sender or to the sending station.

The means for magnetically attracting selected charges boxes or carriers 10 as shown herein, comprises suitable bearings 26, supporting a stationary shaft 27. The shaft 27 may extend completely through the drum 19 and may have mounted thereon suitable electromagnetic windings 28 and core members 29. The drum 19 is revolubly mounted upon the shaft 27 and may be rotated by any suitable means, for example, by means of a motor 30, belt 31 and suitable pulleys 32 and 33 associated with or formed upon the motor 30 and the drum 19, respectively. The annular outer face or shell 34 of the drum 19 is preferably made of brass or other material that is nonresponsive to attraction. Preferably, the outer face of the shell 34 is knurled as shown at 35, or, if desired, a suitable coating of aluminum paint or the like may be applied thereto in order to obtain a suitable friction surface to prevent slippage of the charge boxes relative to the drum. Suitable electrical conductors 36 may be provided to supply electrical energy to the coils 28 of the electromagnets. Preferably, shaft 27 is hollow whereby to provide a passageway through which the conductors 26 may be led into the drum.

It is desirable to so relate the core members 29 and the electromagnet coils 28 that a gradually decreasing magnetic pull or attractive force is operative upon the magnetically responsive charge boxes as such boxes reach the upper limit of travel about the electromagnet, thus facilitating release of the carriers or cartridges 10 to the cross over charge tube shown at 21.

In order to permit the drum 19 to assume a position immediately adjacent the uppermost limit of carriers 10 passing along the conveyor 11, the partitions 12, 13, 14 and 15 may be recessed as indicated at 37, such recesses providing channels into which the corresponding partitions 20 of the drum project to accomplish the indicated purpose.

It is to be understood that a cross over tube 21 is provided for each channel, and if desired, each tube 21 may discharge adjacent a different charge clerk, or if one charge clerk is adequate to handle all the charge transactions, all the cross over tubes 21 may discharge at the same secondary receiving station.

What is claimed is:

1. In a device of the class described, the combination of an elongated conveyor, means disposed adjacent the conveyor for providing a plurality of channels along said conveyor, means for selectively assembling carriers in said channels, a revolving drum having annular channels on its outer face, each of the channels on the drum registering with a channel of the conveyor, whereby articles carried by said conveyor along said conveyor channels will pass adjacent a channel of the drum, means for selectively transferring articles from the channels of the conveyor to the registering channels of the drum, and conveyor means for receiving transferred articles from the drum channels.

2. In a device of the class described, the combination of an elongated conveyor, means disposed adjacent the conveyor for providing a plurality of channels along said conveyor, means for selectively assembling carriers in said channels, a revolving drum having annular channels on its outer face, each of the channels on the drum registering with a channel of the conveyor, whereby articles carried by said conveyor along said conveyor channels will pass adjacent a channel of the drum, magnetically operative means for transferring magnetically responsive articles from the channels of the conveyor to the registering channels of drum, and conveyor means for receiving transferred articles from the drum channels.

3. In a device of the class described the combination of a conveyor adapted to carry elongated cylindrical articles, some of which articles are responsive to magnetic attraction, means for providing a channel along said conveyor, said means being spaced at a distance but slightly greater than the diameter of the cylindrical articles, whereby said articles are moved substantially lengthwise along said conveyor, a revolving drum having an annular channel on its outer face, said drum channel being of approximately the width of the channel provided along said conveyor and registering therewith, means for magnetically energizing the drum portions as they approach and leave said first mentioned channel whereby to transfer magnetically responsive articles from said first mentioned channel to said drum channel, and means for receiving the articles from the drum channel after said articles have been withdrawn from said first mentioned channel, and characterized in that the drum has an anti-skid or anti-slip surface against which articles are held in contact by the magnetic attractive force of the drum for removing such articles from the first mentioned conveyor.

4. A device as specified in claim 3 and characterized in that the drum has an anti-skid or anti-slip surface against which articles are held in contact by the magnetic attractive force of the drum for removing such articles from the first mentioned conveyor.

WILLIAM F. NORDMEYER.

CERTIFICATE OF CORRECTION.

Patent No. 2,250,810. July 29, 1941.

WILLIAM F. NORDMEYER.

It is hereby certified that error appears in the printed specification of the above numbered patent requiring correction as follows: Page 3, second column, line 42, beginning with "A device" strike out all to and including the word and period "conveyor." in line 47, comprising claim 4, and insert instead the following -

> In a device of the class described the combination of a conveyor adapted to carry elongated cylindrical articles, some of which articles are responsive to magnetic attraction, means for providing a channel along said conveyor, said means being spaced at a distance but slightly greater than the diameter of the cylindrical articles, whereby said articles are moved substantially lengthwise along said conveyor, a revolving drum having an annular channel on its outer face, said drum channel being of approximately the width of the channel provided along said conveyor and registering therewith, means for magnetically energizing the drum portions as they approach and leave said first mentioned channel whereby to transfer magnetically responsive articles from said first mentioned channel to said drum channel, and means for receiving the articles from the drum channel after said articles have been withdrawn from said first mentioned channel. ;

and that the said Letters Patent should be read with this correction therein that the same may conform to the record of the case in the Patent Office.

Signed and sealed this 30th day of September, A. D. 1941.

(Seal)

Henry Van Arsdale,
Acting Commissioner of Patents.